United States Patent
Hsuan

(10) Patent No.: US 7,667,739 B2
(45) Date of Patent: Feb. 23, 2010

(54) BRIGHTNESS ADJUSTING METHODS FOR VIDEO FRAMES OF VIDEO SEQUENCE BY APPLYING SCENE CHANGE DETECTION AND/OR BLINKING DETECTION AND BRIGHTNESS ADJUSTING DEVICES THEREOF

(75) Inventor: Chih-Lin Hsuan, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 402 days.

(21) Appl. No.: 11/611,140

(22) Filed: Dec. 15, 2006

(65) Prior Publication Data
US 2008/0143883 A1 Jun. 19, 2008

(51) Int. Cl.
H04N 5/235 (2006.01)
H04N 5/228 (2006.01)
H04N 5/222 (2006.01)
H04N 5/57 (2006.01)
H04N 5/14 (2006.01)
H04N 9/64 (2006.01)
G06K 9/40 (2006.01)

(52) U.S. Cl. .............. 348/222.1; 348/333.01; 348/687; 348/688; 348/701; 382/274

(58) Field of Classification Search ............ 348/207.99, 348/208.14, 222.1, 227.1, 687, 688, 701, 348/333.01–333.13; 382/168–172, 254, 382/274; 345/589
See application file for complete search history.

(56) References Cited

U.S. PATENT DOCUMENTS

| 6,154,258 | A  | * | 11/2000 | Ohtsuka ................ 348/578 |
| 7,218,777 | B2 | * | 5/2007  | Asano et al. ............ 382/168 |
| 7,292,734 | B2 | * | 11/2007 | Lee et al. .............. 382/274 |
| 7,424,148 | B2 | * | 9/2008  | Goh .................... 382/169 |
| 2004/0032982 | A1 | * | 2/2004 | Nishizawa .............. 382/171 |
| 2005/0018920 | A1 | * | 1/2005 | Ramamurthy ............ 382/254 |
| 2005/0207669 | A1 | * | 9/2005 | Kameyama .............. 382/274 |
| 2007/0065008 | A1 | * | 3/2007 | Kao et al. .............. 382/169 |
| 2007/0071345 | A1 | * | 3/2007 | Wang .................. 382/254 |

* cited by examiner

Primary Examiner—Sinh Tran
Assistant Examiner—Richard M Bemben
(74) Attorney, Agent, or Firm—Winston Hsu

(57) ABSTRACT

A brightness adjusting method for video frames of a video sequence includes receiving a current video frame of the video sequence and performing a scene change detection to determine if a scene change occurs between the current video frame and a previous video frame. Thereafter, one of a plurality of candidate brightness adjusting schemes is applied to the current video frame according to a scene change detection result.

18 Claims, 2 Drawing Sheets

BRIGHTNESS ADJUSTING METHODS FOR VIDEO FRAMES OF VIDEO SEQUENCE BY APPLYING SCENE CHANGE DETECTION AND/OR BLINKING DETECTION AND BRIGHTNESS ADJUSTING DEVICES THEREOF

BACKGROUND

The present invention relates to processing video frames, and more particularly, to a brightness adjusting methods for video frames of a video sequence and the related devices thereof.

While processing video sequences, in which the video sequence comprises a series of video frames, it is possible to collect pixels' statistics corresponding to each video frame, for example, the luminance value (Y) and chrominance values (U, V) of each pixel. Based on the collected statistics, it is possible to manipulate the distributions to make the video picture more favorable to users. For example, normalizing the luminance distribution to expand the range of distribution, and thus enhances the contrast of the video frame. This process of manipulating the display characteristics is well known to those of average skill in the art and therefore additional explanatory details are omitted for the sake of brevity. Many methods are well documented in the related art. Any such method is equally valid as an example herein.

It is well known to those of average skill in this art that when many video frames are similar but still have different brightness distributions, said conventional normalization process for manipulating the brightness distribution of the entire picture could cause some points to blink. The blinking effect is visible to a viewer of the series of video frames.

The related art utilizes noise suppressing techniques such as an IIR filter (Infinite Impulse Response filter) to help reduce the blinking problem. This is commonly called smoothing. However, there are problems with this related art approach. First, while the blinking is eliminated, unwanted smoothing of the scene transitions (i.e., scene changes) is introduced. The smoothing operation of the related art is not selectively applied and as a result, the conventional methods and techniques incorrectly smoothes content change of video frames in the video sequence when those video frames are not similar but different from each other.

SUMMARY

An objective of the claimed disclosure is to provide brightness adjusting methods for video frames of a video sequence by applying blinking detection or scene change detection.

According to an embodiment of the claimed disclosure, a brightness adjusting method is disclosed. The method comprises: receiving a current video frame of the video sequence; performing a scene change detection to determine if a scene change occurs between the current video frame and a previous video frame; performing a blink detection to determining if blinking occurs by comparing the current frame and at least two previous frames; and applying one of a plurality of candidate brightness adjusting schemes to the current video frame according to at least a detection result.

An embodiment of a brightness adjusting device includes: a video buffer, for receiving a current video frame of the video sequence; a scene change detector, coupled to the video buffer, for generating a scene change detection result by comparing the current video frame and a previous video frame; a blinking detector, for generating a blinking detection result based on the current video frame and two previous video frames; a storage unit, for storing a plurality of candidate brightness adjusting schemes; and a video processor, for applying one of the plurality of stored candidate brightness adjusting schemes to the current video frame according to at least a detection result.

These and other objectives of the present disclosure will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
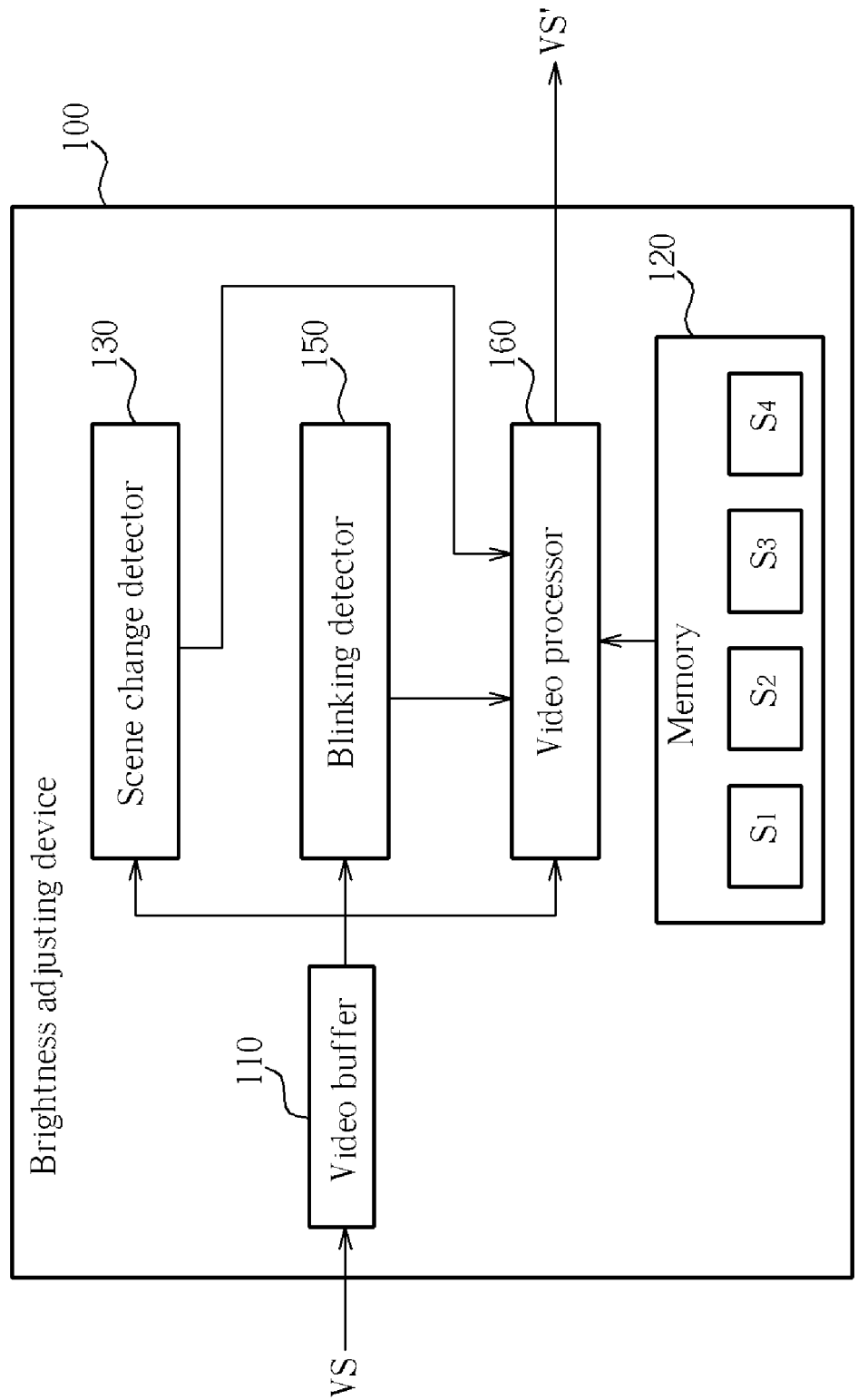
FIG. 1 is a block diagram illustrating a brightness adjusting device.

FIG. 1 is a block diagram illustrating a brightness adjusting device 100 according to an embodiment of the present disclosure. The brightness adjusting device 100 is for processing video frames of a video sequence VS, which comprises a video buffer 110, a memory (storage unit) 120, a scene change detector 130, a blinking detector 150, and a video processor 160. Furthermore, the video processor 160 retrieves incoming video sequence VS from the video buffer 110, and select a specific adjusting scheme set in memory 120 for the video frames in video sequence VS, and then outputs an adjusted video sequence VS'. By way of example, and not limitation, the present disclosure is capable of accepting any video sequence VS such as a broadcast video stream, an MPEG video stream, and so on. By way of example, and not limitation, the present disclosure is capable of outputting the adjusted video sequence VS' in any video format or otherwise as dictated by the manufacturing needs at hand. The scene change detector 130 is coupled to the video buffer 110, and used for generating a scene change detection result according to differences between a current video frame and a previous video frame of the video sequence VS. An exemplary embodiment of scene change detection is by calculating and comparing the correlations of the video frames. The memory 120 is utilized for storing a plurality of candidate brightness adjusting schemes. In this embodiment, only four candidate brightness adjusting schemes S1, S2, S3 and S4 are shown in FIG. 1. However, it should be noted that the present invention is not limited to the number of brightness adjusting schemes set in the memory 120. Additionally, the candidate brightness adjusting schemes stored in the memory 120 are programmable to meet specific design requirements. In this embodiment, four candidate brightness adjusting schemes S1, S2, S3 and S4 are defined as below:

S1: Perform a fast curve adjusting to complete the brightness adjustment (e.g., change the curve settings rapidly, or change the curve settings within the period of 1 field);

S2: Perform a slow curve adjusting to complete the brightness adjustment (e.g., only allow the curve settings change for +/−1 within the period of each field);

S3: Perform a middle curve adjusting to complete the brightness adjustment (e.g., change the curve settings within the period of 4 fields, or within an unnoticeable period); and S4: Maintain the brightness (e.g. ignore the change required).

The term "curve" describes the adjusting amounts for various luminance values, and it may be pictured as a graph with a horizontal axis (the X axis) representing the original luminance value and a vertical axis (the Y axis) representing the desired luminance value after adjustment. Curve settings determine how various luminance values can be tuned after applying brightness adjustment.

When the candidate brightness adjusting scheme S1 is selected, the video processor 160 typically completes the brightness adjustment in M fields. For example, the curve settings are changed in 1 field, which means the curve change is completed in 1/60 seconds for NTSC systems. When the candidate brightness adjusting scheme S2 is selected, the video processor 160 gradually adjusts the brightness by changing the luminance values in small increment or decrement per field. Brightness adjusting scheme S2 is typically applied when there is no scene change detected, and in order to avoid blinking, rapid change in curve settings is not allowed. In an embodiment, the curve settings can only be changed by a small amount such as +/−1 every field, for example, if the luminance value is meant to be changed from 190 to 200, S2 takes 10 fields (10/60 seconds for NTSC) to complete the curve setting change. When the candidate brightness adjusting scheme S3 is selected, the video processor 160 typically completes the execution of the brightness adjusting scheme S3 in K fields. In some embodiments, K is specially chosen to make the user unnoticeable to the delay, for example, human eye is less sensitive to changes occurred within 1/30~1/15 seconds, so K may be 4 for NTSC systems (4 fields=1/15 seconds). When the candidate brightness adjusting scheme S4 is selected, the video processor 160 will maintain the brightness, that is, no brightness adjustment is applied to the current video frame. Please note that M<K in this disclosure. However, it is obvious that factors can arise in which the video processor 160 may not fully complete the tasks associated with the application of any given specific brightness adjusting scheme prior to some predetermined time period. The currently applied adjusting scheme may not necessary to be completed, as it may be interrupted by a command for applying another adjusting scheme. This is not a limitation of the present invention. It is obvious to one having average skill in this art, that many options are available to handle this situation. Further details are omitted for the sake of brevity. In addition, the values M and K are programmable according to design requirements.

The video processor 160 is coupled to the video buffer 110 and the memory 120. The video processor 160 is utilized for applying one of the stored candidate brightness adjusting schemes S1, S2, S3, S4 to the current video frame according to the scene change detection result that is generated by the scene change detector 130. The blinking detector 150 is coupled to the video buffer 110 and utilized for applying a blinking detection upon the video frames including the current video frame. Additionally, the blinking detector 150 is configured to generate a blinking detection check result used to indicate whether the above blinking detection is required to be performed. In an embodiment, the blinking detector 150 performs the blinking detection by tracking movement of bright points in three consecutive video frames. For example, if the bright point in a first video frame corresponds to a gray level of 100, the bright point in a second video frame following the first video frame corresponds to a gray level 200, and the bright point in a third video frame following the second video frame corresponds to a gray level of 120, the occurrence of blinking is detected upon identifying the bright point oscillation. Similarly, if the bright point in a first video frame corresponds to a high gray level, the bright point in a second video frame following the first video frame corresponds to a relative low gray level, and the bright point in a third video frame following the second video frame corresponds to a high gray level, the occurrence of blinking is also detected upon identifying the bright point oscillation. Therefore, for the beginning two frames, the operation of blinking detection fails to work properly. Therefore, the blinking detector 150 implemented in this embodiment is to check if the current video frame within a scene is preceded by a plurality of video frames of the same scene and generates the blinking detection check result indicating that the blinking detection is required if the current video frame is preceded by the plurality of video frames. In other words, when the current video frame is not one of the initial two video frames of a scene, the blinking detector 150 is allowed to perform the blinking detection upon three video frames within the same scene.

Regarding a specific scene change detection result, generated by the scene change detector 130, indicates that no scene change occurs between the current video frame and the previous video frame, the processor 160 will access the memory 120 for retrieving the brightness adjusting scheme which changes the curve setting slowly (e.g. S2), and applies the selected brightness adjusting scheme to the current video frame.

Furthermore, when the scene change detection result, generated by the scene change detector 130, indicates that a scene change occurs between the current video frame and the previous video frame, the video processor 160 will apply one of the candidate brightness adjusting schemes according to the blinking detection result generated by the blinking detector 150. In the event that the blinking detection result indicates that no blinking is detected, then the video processor 160 will access the memory 120 for retrieving the brightness adjusting scheme which changes the curve settings rapidly (e.g. S1) of the stored candidate brightness adjusting schemes, and apply the selected brightness adjusting scheme to the current video frame. In another case when blinking is detected by the blinking detector 150, the video processor 160 will apply the brightness adjusting scheme with a middle curve change rate (e.g. S3). In some cases, the video processor 160 will not apply any brightness adjustment (e.g. S4). For example, in a case where the blinking of the current scene is detected and a scene change between the current scene and a following scene is also detected, applying the brightness adjustment might greatly degrade the picture quality if the blinking is induced due to the scene change. Therefore, the present invention provides an option to avoid changing luminance values of video frames.

The present invention provides for no limitation on the number of brightness adjusting schemes. The results, for example, improved contrast of the video image, may benefit from having a richer selection of brightness adjusting schemes available, however, this is not a limitation of the present invention.

Please note that the scene change detector 130 compares a difference between the luminance statistics of the current video frame and the previous video frame with a threshold value. The threshold value can be determined in many ways and can be set according to the needed manufacturing specifications. The details of selecting the threshold value are unimportant to the spirit and operation of the present invention and therefore further details are omitted herein. Therefore, if the difference exceeds the threshold value, the scene change detector 130 identifies that these two video frames belong to different scenes. As a result, a scene change is detected.

In an embodiment of the present invention, the blinking detector 150 utilizes a predetermined selection rule to identify a plurality of target values (for example the above-mentioned brightest point in each video frame) from luminance statistics of at least three adjacent video frames. The blinking detector 150 references a distribution of these target values to determine if blinking occurs. The predetermined selection rule that can be utilized by the blink detector 150 to determine if blinking occurs can be any rule that meets the needs at hand. For completeness of this disclosure, the following predetermined selection rules are provided by way of example and not limitation to the present invention. One rule is that the target value can be selected according a predetermined percentile of the luminance distribution of a video frame. Another rule is that a plurality of pixels of a video frame are sorted and then a $k^{th}$ pixel is selected from the sorted pixels to be a target value. Other examples are obvious and well known to those having average skill in this art and are therefore omitted herein for the sake of brevity.

Please note, when the current video frame within a scene is preceded by a plurality of video frames of the same scene, the blinking detector 150 will generate a blinking detection check result indicating that the blinking detection is required.

As is well known to one having average skill in this art, it is not necessary for said components of the brightness adjusting device 100 to be configured exactly as described. Certain said functionality of the said components are easily be divided amongst additional other components (not shown and not further mentioned herein) or can easily be combined into fewer components. Those of average skill in this art know that many modifications to the embodiments presented herein are possible and those modifications still obey the spirit of the present invention.

Figure 2:
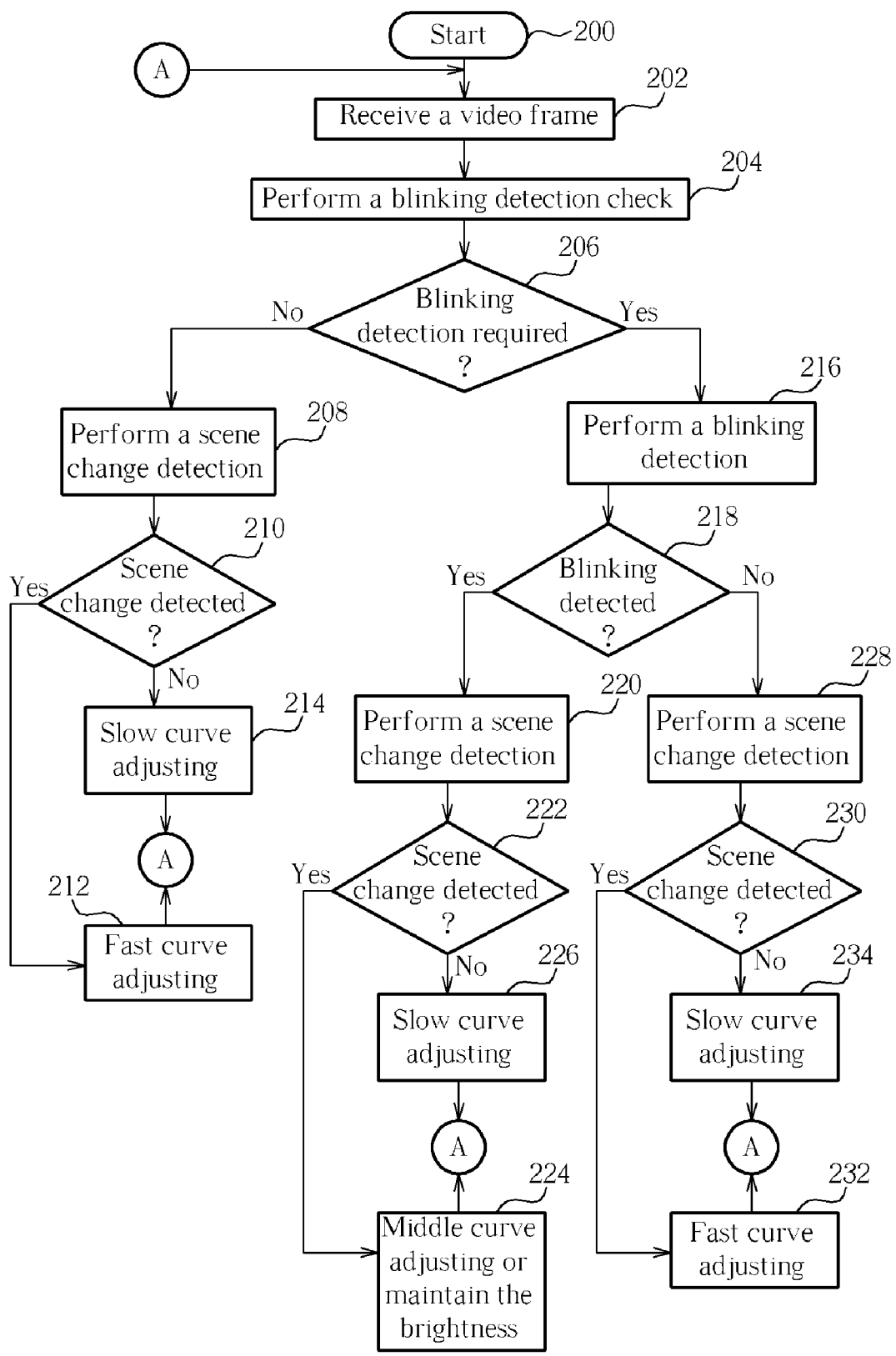
FIG. 2 is a flow diagram illustrating the operating of the brightness adjusting device of FIG. 1.

FIG. 2 is a flow diagram illustrating the operation of the brightness adjusting device 100 shown in FIG. 1 according to an embodiment of the present invention. The brightness adjusting method comprises the following steps:

Step 200: Start.

Step 202: Receive a video frame.

Step 204: Perform a blinking detection check.

Step 206: Is a blinking detection required? If yes, then go to step 216. If no, then go to step 208.

Step 208: Perform a scene change detection.

Step 210: Is a scene change detected? If yes, then go to step 212. If no, then go to step 214.

Step 212: Apply the brightness adjusting scheme S1 to perform a fast curve adjusting. Go to step 202.

Step 214: Apply the brightness adjusting scheme S2 to perform a slow curve adjusting. Go to step 202.

Step 216: Perform a blinking detection.

Step 218: Is blinking detected? If yes, then go to step 220. If no, then go to step 228.

Step 220: Perform a scene change detection.

Step 222: Is a scene change detected? If yes, then go to step 224. If no, then go to step 226.

Step 224: Apply the brightness adjusting scheme S3 to perform a middle curve adjusting or the brightness adjusting scheme S4 to maintain the brightness. Go to step 202.

Step 226: Apply the brightness adjusting scheme S2 to perform a slow curve adjusting. Go to step 202.

Step 228: Perform a scene change detection.

Step 230: Is a scene change detected? If yes, then go to step 232. If no, then go to step 234.

Step 232: Apply the brightness adjusting scheme S1 to perform a fast curve adjusting. Go to step 202.

Step 234: Apply the brightness adjusting scheme S2 to perform a slow curve adjusting. Go to step 202.

Following the steps as described above and in FIG. 2, please reference the following example which further highlights and defines the inventive features. Suppose a video sequence containing at least four video frames F0, F1, F2, F3 is to be processed. Regarding this example, the video frame F0 is first received and at this point, the series of video frames, up to video frame F0 (in other words, the video frames preceding the video frame F0) have resulted in a stable status.

Next, video frame F1 is received (step 202). The blinking detector 150 is operative to perform a blinking detection check (step 204). The blinking detector 150 determines if it is necessary to actually check for blinking or if it is not necessary to check for blinking. For example, if there was a scene change but there have been an insufficient number of video frames received since the scene change, then it is not necessary to check for blinking. In the case where a blinking detection is not necessary until the third video frame, the scene change detector 130 then determines if a scene change occurred between video frame F1 and the previous video frame, video frame F0 (step 208). If the scene change detector 130 determines that a scene change does not occur then the video processor 160 accesses the memory 120 to load, for example, the brightness adjusting scheme S2 (step 214). Because a scene change is not detected, the present invention utilizes a slow curve adjusting to adjust (i.e., improve, enhance) the contrast/brightness of the video image via adjustments to the corresponding luminance values and these adjustments, in this case, are applied slowly to ensure the viewer does not notice any negative visual impact as a result of the adjustment (e.g., sudden change in brightness). Consider that the scene change detector 130 detects that a scene change occurs. In this case, as shown in FIG. 2, the video processor 160 accesses the memory 120 to load, for example, the brightness adjusting scheme S1 (step 212). In some embodiments, the scene change detector detects there is a scene change by comparing the statistics difference between the current frame and its preceding frame with a threshold.

However, when the blinking detector 150 determines that it is necessary to actually check for blinking as for example, three consecutive frames within the same scene are received, the blinking detector 150 performs blinking detection (step 216). When the blinking effect is detected, as for example the bright point changes its luminance value from low to high and then back to low in from F0 to F2, the scene change detector 130 determines if a scene change occurred between video frame F2 and the previous video frame, video frame F1 (step 222). If the scene change detector 130 determines that a scene change occurs then the video processor 160 accesses the memory 120 to load, for example, the brightness adjusting scheme S3 or S4 (step 224). However, if the scene change detector 130 determines that a scene change does not occur then the video processor 160 accesses the memory 120 to load, for example, the brightness adjusting scheme S2 (step 226).

Back to step 218, when the blinking effect is not detected, the scene change detector 130 is activated to determine if a scene change occurred between video frame F2 and the previous video frame, video frame F1 (step 228). If the scene change detector 130 determines that a scene change occurs then the video processor 160 accesses the memory 120 to load, for example, the brightness adjusting scheme S1 (step 232). However, if the scene change detector 130 determines that a scene change does not occur then the video processor 160 accesses the memory 120 to load, for example, the brightness adjusting scheme S2 (step 234).

If a scene change occurs between video frames F0 and F1, no blinking detection is required for video frame F2 because there was a scene change but there have been an insufficient number of video frames received since the scene change (steps 204, 206). Then, the scene change detector 130 is activated to determine if a scene change occurred between video frame F2 and the previous video frame, video frame F1 (step 208).

When video frame F3 is received (step 202) and suppose that a scene change did not occur between video frames F1 and F2, no blinking detection is required because there was a scene change but there have been an insufficient number of video frames received since the scene change (steps 204, 206). Then, the scene change detector 130 is activated to determine if a scene change occurred between video frame F2 and the previous video frame, video frame F1 (step 208).

As mentioned above, when a blinking detection is not necessary due to insufficient number of video frames is received after a scene change, the selection of the brightness adjusting scheme is dependent solely upon the scene change detection result; however, when a blinking detection is necessary, the selection of the brightness adjusting scheme is dependent upon both the blinking detection result and the scene change detection result. The video frame F4 and its following video frames all follow the flow shown in FIG. 2. Since the related operations are detailed above, further description is omitted for the sake of brevity.

The brightness adjusting device 100 can, in another embodiment, be utilized in conjunction with an output/display device (not shown) and a user interface (not shown). The user interface can comprise on-screen (i.e., touch screen controls on the display device) or a combination of remote control device and on-screen user interface displays. The user can customize, select, and adjust all aspect of the brightness adjusting device 100 via control of the user interface. For example, variables like the slow curve adjusting and the fast curve adjusting, etc. can all easily be controlled, changed, and edited via the user interface of the brightness adjusting device 100. In this same way, additional adjusting schemes can be added to the memory 120 and stored in the memory 120 to become part of the plurality of candidate brightness adjusting schemes. Thresholds utilized by the scene change detector 130 and blinking detection rules utilized by the blinking detector 150 can also easily be changed, added, editing, and so on by the user via the user interface.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A brightness adjusting method for video frames of a video sequence, the method comprising:

(a) receiving a current video frame of the video sequence;

(b) performing a scene change detection to determine if a scene change occurs between the current video frame and a previous video frame; and (c) applying one of a plurality of candidate brightness adjusting schemes to the current video frame according to a scene change detection result;

wherein step (b) comprises:
(b1) performing a blinking detection check to determine if a blinking detection is required;
(b2) if a blinking detection check result indicates that the blinking detection is required, performing the scene change detection and the blinking detection; and
(b3) if the blinking detection check result indicates that the blinking detection is not required, performing the scene change detection;

step (c) comprises:
(c1) if the blinking detection check result indicates that the blinking detection is required, applying one of the candidate brightness adjusting schemes to the current video frame according to the scene change detection result and a blinking detection result; and
(c2) if the blinking detection check result indicates that the blinking detection is not required, applying one of the candidate brightness adjusting schemes to the current video frame according to the scene change detection result;

step (c2) comprises:
when the scene change detection result indicates that a scene change occurs between the current video frame and the previous video frame, a first brightness adjusting scheme of the candidate brightness adjusting schemes is applied to the current video frame; and
when the scene change detection result indicates that no scene change occurs between the current video frame and the previous video frame, a second brightness adjusting scheme of the candidate brightness adjusting schemes is applied to the current video frame; and step (c1) comprises:
when the blinking detection result indicates that blinking occurs:
if the scene change detection result indicates that a scene change occurs between the current video frame and the previous video frame, applying a third brightness adjusting scheme of the candidate brightness adjusting schemes to the current video frame; and
if the scene change detection result indicates that no scene change occurs between the current video frame and the previous video frame, applying a fourth brightness adjusting scheme of the candidate brightness adjusting schemes to the current video frame; and
when the blinking detection result indicates that no blinking occurs:
if the scene change detection result indicates that a scene change occurs between the current video frame and the previous video frame, applying a fifth brightness adjusting scheme of the candidate brightness adjusting schemes to the current video frame; and
if the scene change detection result indicates that no scene change occurs between the current video frame and the previous video frame, applying a sixth brightness adjusting scheme of the candidate brightness adjusting schemes to the current video frame.

2. The method of claim 1, wherein the second brightness adjusting scheme, the fourth brightness adjusting scheme, and the sixth brightness adjusting scheme are the same, and the first brightness adjusting scheme is identical to the fifth brightness adjusting scheme.

3. The method of claim 1, wherein the first brightness adjusting scheme is completed in M fields, the second brightness adjusting scheme is completed in N fields, the third brightness adjusting scheme is completed in K fields, and M<K<N.

4. The method of claim 1, wherein the first brightness adjusting scheme is completed in M fields, the second brightness adjusting scheme is completed in N fields, the third brightness adjusting scheme maintains brightness of the current video frame, and M<N.

5. The method of claim 1, wherein the scene change detection is performed by:
   comparing a difference between a luminance distribution of the current video frame and a luminance distribution of the previous video frame with a threshold value; and
   detecting a scene change between the current video frame and the previous video frame when the difference is greater than the threshold value.

6. The method of claim 1, wherein the blinking detection is performed by:
   utilizing a predetermined selection rule to identify target values from luminance statistics of at least three adjacent video frames; and
   referencing a distribution of the target values to determine if blinking occurs.

7. The method of claim 6, wherein the predetermined selection rule is:
   for each of the three adjacent video frames, selecting a target value according a predetermined percentile of a luminance distribution of a video frame.

8. The method of claim 6, wherein the predetermined selection rule is:
   for each of the three adjacent video frames, sorting a plurality of pixels of a video frame according to gray levels, and selecting a $k^{th}$ pixel from the sorted pixels to be a target value.

9. The method of claim 1, wherein the blinking detection check is performed by:
   checking if the current video frame within a scene is preceded by a plurality of video frames of the scene; and
   if the current video frame is preceded by the plurality of video frames, the blinking detection check result indicates that the blinking detection is required.

10. A brightness adjusting device for processing video frames of a video sequence, the brightness adjusting device comprising:
    a video buffer, for receiving a current video frame of the video sequence;
    a scene change detector, coupled to the video buffer, for generating a scene change detection result according to a scene change between the current video frame and a previous video frame;
    a storage unit, for storing a plurality of candidate brightness adjusting schemes;
    a video processor, coupled to the video buffer, the scene change detector, and the storage unit, for applying one of the plurality of stored candidate brightness adjusting schemes to the current video frame according to the scene change detection result; and
    a blinking detector, coupled to the video buffer, for performing a blinking detection, and a blinking detection check to determine if the blinking detection is required;
    wherein if a blinking detection check result indicates that the blinking detection is required, the scene change detector is enabled to perform the scene change detection and the blinking detector is enabled to perform the blinking detection; if the blinking detection check result indicates that the blinking detection is not required, the scene change detector is enabled to perform the scene change detection; if the blinking detection check result indicates that the blinking detection is required, the video processor applies one of the candidate brightness adjusting schemes to the current video frame according to the scene change detection result and a blinking detection result; if the blinking detection check result indicates that the blinking detection is not required, the video processor applies one of the candidate brightness adjusting schemes to the current video frame according to the scene change detection result;
    when the blinking detection check result generated by the blinking detector indicates that the blinking detection is not required and the scene change detection result generated by the scene change detector indicates that a scene change occurs between the current video frame and the previous video frame, the video processor applies a first brightness adjusting scheme of the candidate brightness adjusting schemes to the current video frame; and
    when the blinking detection check result indicates that the blinking detection is not required and the scene change detection result indicates that no scene change occurs between the current video frame and the previous video frame, the video processor applies a second brightness adjusting scheme of the candidate brightness adjusting schemes to the current video frame;
    when the blinking detection check result indicates that the blinking detection is required and the blinking detection result indicates that blinking occurs:
      if the scene change detection result indicates that a scene change occurs between the current video frame and the previous video frame, the video processor applies a third brightness adjusting scheme of the candidate brightness adjusting schemes to the current video frame; and
      if the scene change detection result indicates that no scene change occurs between the current video frame and the previous video frame, the video processor applies a fourth brightness adjusting scheme of the candidate brightness adjusting schemes to the current video frame; and
    when the blinking detection check result indicates that the blinking detection is required and the blinking detection result indicates that no blinking occurs:
      if the scene change detection result indicates that a scene change occurs between the current video frame and the previous video frame, the video processor applies a fifth brightness adjusting scheme of the candidate brightness adjusting schemes to the current video frame; and
      if the scene change detection result indicates that no scene change occurs between the current video frame and the previous video frame, the video processor applies a sixth brightness adjusting scheme of the candidate brightness adjusting schemes to the current video frame.

11. The brightness adjusting device of claim 10, wherein the second brightness adjusting scheme, the fourth brightness adjusting scheme, and the sixth brightness adjusting scheme are the same, and the first brightness adjusting scheme stored is identical to the fourth brightness adjusting scheme.

12. The brightness adjusting device of claim 10, wherein the video processor completes execution of the first brightness adjusting scheme in M fields, the video processor completes execution of the second brightness adjusting scheme in N fields, the video processor completes execution of the third brightness adjusting scheme in K fields, and M<K<N.

13. The brightness adjusting device of claim 10, wherein the video processor completes execution of the first brightness adjusting scheme in M fields, the video processor completes execution of the second brightness adjusting scheme in N fields, the video processor executes the third brightness adjusting scheme for maintaining brightness of the current video frame, and M<N.

14. The brightness adjusting device of claim 10, wherein the scene change detection compares a difference between a luminance distribution of the current video frame and a luminance distribution of the previous video frame with a threshold value; and detects a scene change between the current video frame and the previous video frame when the difference is greater than the threshold value.

15. The brightness adjusting device of claim 10, wherein the blinking detector utilizes a predetermined selection rule to identify target values from luminance statistics of at least three adjacent video frames including the current video frame; and references a distribution of the target values to determine if blinking occurs.

16. The brightness adjusting device of claim 15, wherein the predetermined selection rule is:
for each of the three adjacent video frames, selecting a target value according a predetermined percentile of a luminance distribution of a video frame.

17. The brightness adjusting device of claim 15, wherein the predetermined selection rule is:
for each of the three adjacent video frames, sorting a plurality of pixels of a video frame according to gray levels, and selecting a $k^{th}$ pixel from the sorted pixels to be a target value.

18. The brightness adjusting device of claim 10, wherein the blinking detector checks if the current video frame within a scene is preceded by a plurality of video frames of the scene and generates the blinking detection check result indicating that the blinking detection is required if the current video frame is preceded by the plurality of video frames.

* * * * *